United States Patent Office 3,083,125
Patented Mar. 26, 1963

3,083,125
METHOD FOR MAKING A POLYMER SEMI-CONDUCTOR AND ARTICLE
Ferdinand Bohlmann, Berlin-Charlottenburg, Hans Dexheimer, Mainz-Mombach, Otto Fuchs, Hofheim, Taunus, and Hans Krämer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 17, 1960, Ser. No. 62,836
6 Claims. (Cl. 117—201)

This invention relates to semi-conductor devices and to a method of making such devices.

In technical practice semi-conductors are finding a continuously growing interest, for example, in the manufacture of transistors, semi-conductor photo-resistances, semi-conductor photo-elements, semi-conductor resistances, semi-conductor rectifiers and the like. Hitherto for this region of electrotechnics primarily semi-conductors having an inorganic basis have been used. In order to extend the application possibilities of semi-conductors, to simplify their manufacture and for better adaptation of their properties to particular requirements, it is in practice of great interest to employ synthetic semi-conductors having an organic basis. Semi-conductors of organic nature have in addition the advantage of a capacity for wide use as antistatic agents. The organic substances hitherto used as semi-conductors, such as anthracene, naphthalene, pyrene, and so on, have the great disadvantage as regards technical application of melting at temperatures that are only slightly elevated, and of being relatively easily volatile. In addition they have at elevated temperatures the further disadvantage of being more or less soluble in liquid media, which is particularly detrimental in the application of the semi-conductor in high frequency or high potential rectifiers.

The present invention relates to a semi-conductor device, for example, a semi-conductor resistance, rectifier, photo element or transistor, with a semi-conducting element consisting of organic semi-conducting compounds and to the use of such compounds in the making of semi-conductor devices. According to the invention there are used as organic semi-conducting compounds reaction products of polyynes, of a type known per se, obtained by heating and/or irradiation at a temperature below the melting point, of polyynes of the general formula $$R_1—(C\equiv C)_n—R_2$$

in which $n$ is a numeral equal to or greater than 2, and $R_1$ and $R_2$ are the same or different organic radicals. Of the products obtained by the heating of polyynes those forming in a temperature range which is by 5° to 20° C. below the melting point are in general particularly advantageous for use according to the invention. Regarding the structure and reactivity of polyynes of the above general formula, see, for example, F. Bohlmann, "Angewandte Chemie," 69, 82 (1957).

The reaction products to be used according to the invention can be obtained by heating and/or irradiation of, for example, the following compounds: 4-methyl-tetradecadiene - (4.12) - triyne(6.8.10)-one(2) (melting point 38.5° C.) and the dinitrophenylhydrazone thereof (melting at 202° C. with decomposition); tetradecatriyne-(4.6.8)-ene(2)-one(12) (melting point 64° C.) and the paracarboxyphenylhydrazone thereof (melting at and above 170° C. with decomposition); tetradecadiyne (2.4.6)-ene(8)-one(12) (melting point 57.5° C.) and the para-carboxyphenylhydrazone thereof (melting point at and above 170° C.); the transdecatriyne(2.4.6)-ene(8)-acid methyl ester (melting point 61° C.); the trans-octadiyne(2.4)ene(6)-acid methyl ester (melting point 32.5° C.); the 2.2.13.13-tetramethyl-tetradecatetrayne-(3.5.7.9)-ene(11)-ol(12)-methyl ether (melting point 114 to 115° C.); the octadiyne-(2.4)-ene(6)-ol(7)-methyl ether (melting point 43° to 46° C.); octadiyne-(2.4)-one(6) (having a melting point of −10° C. and a boiling point under 0.5 mm. of mercury of 30° C.) and the dinitrophenyl hydrazone thereof (melting point 149° C.); heptadecatriyne (7.9.15)-diyne(11.13)-one(4) (melting point 46° C.); tetrakosatetraene(7.9.15.17)-diyne(11.13)-dione(4.21) (melting point 76° C.); heptadecatriene-(7.9.15)-diyne(11.13)-diol(4.17) (melting point 68° C.); heptadecatriene (2.8.10)-diyne(4.6)-ol(1) (melting point 70.7° to 71° C.); decadiyne (4.6)-diene-(2.8)-ol(1) (melting point 68.5° C.); tridecadiyne (7.9)-tetraene (1.3.5.11) (melting point 70.5° C.) and the maleic acid anhydride adduct thereof (melting point 150° C.); hep-heptadecartriene (2.8.10)-diyne(4.6)-ol(1) (melting point 81° C.); 1-bromo-decadiyne (4.6)-diene(2.8) (melting point 44.5° C.); 1-phenyl-nonatriyne (1.3.5)-ene(7)-ol(9) (melting point 103° C.); 1-phenyl-nonatriyne (1.3.5)-ene(7)-al(9) (melting point 75° C.); 1-phenyl-undecatriyne-(1.3.5)-diene(7.9) (melting point 64° C.) and the maleic acid anhydride adduct thereof (melting at 173° C. with decomposition); 3.8-dimethyl-decadiene(2.8)-diyne-(4.6)-diol(1.10)-diacetate (melting point 70° C.) and the diepoxide thereof (melting point 99° C.); hexadiyne (2.4)-dial(1.6) and the bis-dinitrophenyl hydrazone thereof (melting at 215° to 220° C. with decomposition); bis-[cyclohexen(1)-yl(1)]-triacetylene (melting point 71° C.); 1.1.8.8-tetraphenyl-octatriyne (2.4.6)-diol(1.8) (melting point 159° C.); diphenyl triacetylene (melting point 91° to 92° C.); bis[1-oxy-cyclohexyl(1)]-tetraacetylene (melting point 151° C.); pentadiyne (2.4)-ol(1) (melting point −20° C.); 1-cyan-deca-triyne(4.6.8)-ene-(2) (melting point 92° C.); 1-carbomethoxy-decatriyne (4.6.8)-ene(2) (melting at 165° C. with decomposition); bis[1-oxy - 2.2.6.6 - tetramethylcyclohexyl(1)]-butadiyne (melting point 173° C.); bis[1-oxy-2.2.6.6-tetramethyl-cyclohexyl(1)]-hexatriyne (melting point 204° C.); bis-[1-bromo-2.2.6.6-tetramethyl-cyclohexyl(1)] - hexatriyne (melting point 212° to 213° C.); 2.2.9.9-tetramethyl-decadiyne (4.6)-diol(3.8) (melting point 86° C.); 3.8-dichloro - 2.2.9.9 - tetramethyl-decadiyne(4.6) (melting point 164° C.); 2.2.9.9-tetramethyl-decatriyne (3.5.7) (melting point 70° C.); 2.2.17.17-tetramethyl-octadecadiene(3.15)-pentayne (5.7.9.11.13) (melting point 130° C.); 2.2.11.11-tetramethyl-dodecatetrayne (3.5.7.9) (melting point 99° to 100° C.).

It is of particular advantage to use products that have been obtained by heating and/or irradiation of the following polyynes:

Decadiyne(4,6)diol(1.10) (melting point 46° C.) and the diurethane obtained from decadiyne (4.6)diol(1.10) and alpha-naphthylisocyanate; the trans-dodecatriyne (4.6.8) - ene(10) - ol(2) - beta - anthraquinone carboxylic acid ester (melting at 122° to 123° C. with decomposition) and the cis - dodecatriyne(4.6.8) - (10) - ol(2)-beta-anthraquinone carboxylic acid ester (melting point 121° C.); decatriyne-(2.4.6)-ene(8)-ol(9)-methyl ether (melting point 71° C.); bis[cyclohexene(1)-yl(1)]-tetra-acetylene (melting point 127° C.); bis[oxy-methyl]-tetra-acetylene (melting point 115° C.); [1-oxy-cyclohexyl(1)] -triacetylene, bis[1-oxy-cyclohexyl(1)] hexa-acetylene; 2.2.15.15 - tetramethylhexadecahexayne(3.5. 7.9.11.13) (melting point 140° C.); 2.2.17.17-tetramethyl-octadecaheptayne (3.5.7.9.11.13.15) (melting point above 150° C.); octadecahexayne(4.6.8.10.13.14)-diene-(2.16)-diol (1.18)-diacetate.

The conversion products obtained by heating and/or irradiation of polyynes of the above general structure are in general deeply colored and difficultly soluble or insoluble.

For some purposes of application the difficult solubility or practical insolubility of the conversion products of polyynes may be detrimental because the products for these particular purposes of application cannot be applied in a simple manner to a solid substratum, for example, to a metal or an inorganic or organic non-conductor, such as quartz or a synthetic plastic material or the like. These production difficulties may easily be avoided by first preparing a solution of the initial polyyne of the greatest possible concentration, using an easily volatile solvent, for example, acetone, by applying this solution to a solid substratum and then evaporating the solvent. The coated product obtained is then subjected to heat and/or irradiation in order to convert the polyyne layer into the required product of semi-conducting character.

The following example serves to illustrate the invention but it is not intended to limit it thereto.

4.63 grams of a pale violet polyyne of the general formula given above in which $n=2$ and $R_1=R_2=-CH_2-CH_2-CH_2.O.CO.NH$

(melting point 166 to 167° C.) were heated for 24 hours to 140° to 150° C. in a nitrogen atmosphere. The resulting product was extracted by boiling for 1 hour with acetone, with stirring, and the hot mixture was filtered. The residue was rinsed with hot acetone and dried. In this manner 1.87 grams were obtained of an insoluble, deep dark violet colored reaction product which did not melt up to 250° C. The dependence upon temperature of the specific resistance of the reaction product is seen from the following table:

| °C. | 50 | 100 | 150 | 200 |
|---|---|---|---|---|
| Ω, cm. | $10^{10}$ | $2.10^9$ | $6.10^6$ | $10^3$ |

The unreacted initial polyyne passed into solution in the extraction and could be recovered by evaporation of the acetone.

We claim:

1. A method of making a semi-conductor device which comprises applying to a solid substratum a polyyne of the formula $$R_1-(C{\equiv}C)_n-R_2$$

in which $n$ represents an integer of at least 2 and $R_1$ and $R_2$ indicate organic radicals and heating said polyyne to a temperature within the range of 5° to 20° C. below its melting point.

2. A method as defined in claim 1 wherein the polyyne is applied to the substratum in the form of a solution in a volatile solvent and the volatile solvent is subsequently volatilized.

3. A method as defined in claim 1 wherein the polyyne is heated by irradiation.

4. A product produced according to the method of claim 1.

5. A method of making a semi-conductor device which comprises applying to a solid substratum a polyyne of the formula $$R_1-(C{\equiv}C)_n-R_2$$

in which $n$ represents an integer of at least 2 and $R_1$ and $R_2$ indicate the same organic radicals and heating said polyyne to a temperature within the range of 5° to 20° C. below its melting point.

6. A method of making a semi-conductor device which comprises applying to a solid substratum a polyyne of the formula $$R_1-(C{\equiv}C)_n-R_2$$

in which $n$ represents an integer of at least 2 and $R_1$ and $R_2$ indicate different organic radicals and heating said polyyne to a temperature within the range of 5° to 20° C. below its melting point.

References Cited in the file of this patent

FOREIGN PATENTS 198,944     Austria _____ Aug. 11, 1958